Patented May 25, 1948

2,441,953

UNITED STATES PATENT OFFICE 2,441,953

PROCESS OF FINISHING WOOD SURFACES WITH RESIN COATINGS

William E. Berry and Melville M. Wilson, Cincinnati, Ohio, assignors to Interchemical Corporation, New York, N. Y., a corporation of Ohio No Drawing. Application March 18, 1942, Serial No. 435,144

4 Claims. (Cl. 117—72)

This invention relates to the art of wood finishing, and it includes a new method of obtaining clear or colored finishes having unusual resistance to abrasion, scratching, hot and cold liquids, organic solvents, and the like, and to the use of novel compositions for obtaining these results. The invention is particularly directed to a new coating composition which yields finishes additionally characterized by their ease of polishing to a high gloss and lack of brittleness.

All wood finishing systems may be divided into two parts: (1) Preparation of the wood surface, and (2) covering the prepared surface with a continuous, protective film. The preparation of the wood surface, or first part, usually involves staining the wood, applying a stiffening coat to the raised fibers, sanding, and filling the pores of the wood, and the second part usually includes the application of one or more coatings of varnish, lacquer or resinous films (which may be called "finish coats") often with sanding between coats, and if desired, a final rub down or polishing with oil and pumice or similar fine abrasive.

In conventional practice the stiffening or wash coat consists of a thin dispersion of shellac or cellulose derivative in a volatile solvent, the pores of the wood are filled with a suspension of pigment in a drying oil or alkyd resin vehicle, and then one or more coats of a finishing varnish or lacquer are applied. The finish coat may contain a transparent pigment to give it a flat or dull appearance, or it is hardened sufficiently to permit rubbing with pumice and oil to give the satin-like appearance desirable for furniture.

Wood finishes of greater durability and resistance to various liquids than the conventional oil varnishes have been prepared by employing one or more finish coats of heat-hardenable, synthetic resins. These finish coats may be of the "air-drying" type, but best results have been obtained when the finishes have been hardened by baking. For finishes of this kind the phenol-formaldehyde, urea-formaldehyde and alkyd resins have been tried, and blends of these resins, suitably modified, have yielded the most satisfactory coating compositions. (See the Maisch U. S. Patent No. 2,228,837, issued January 14, 1941, and the Oeffinger and Stauffer U. S. Patent No. 2,201,914, issued May 21, 1940.)

Finishes containing appreciable amounts of phenolaldehyde resins can be baked to hard films which polish well, but long baking periods (and/or high temperatures) are required unless excessive amounts of accelerators are added which cause the films to become brittle. Similarly, the urea resins are too brittle, although they polish fairly well. The alkyd resins are too soft, and it is practically impossible to heat them long enough to obtain reasonably hard films without discoloration or damage to the finish. Blends of all three of these resins have been tried, including oil-modified alkyd resins and modified fossil gums, but as far as is known, no composition has heretofore been prepared which yields flexible films capable of being polished to the type of finish obtained with the old air-drying wood varnishes.

There have been two difficulties encountered in the preparation of these heat-hardenable finishes for use on furniture, namely: (1) Obtaining a satisfactory bond between the finish and the wood, and (2) obtaining a coating which was sufficiently flexible so that it would not crack or chip off, and yet could be baked hard enough in a reasonably short time to permit polishing to the so-called "high piano" finish, or to more satin-like finishes so desirable on furniture.

This invention provides a method of wood finishing wherein a tight bond is obtained between the heat-hardenable coatings and the wood surface, and a novel finish coat which is characterized by its quick heat hardening, lack of brittleness and relative ease with which it may be polished to a satin finish with the usual polishing compositions for this purpose. Also, this finish is highly resistant to abrasion, scratching, hot and cold liquids, organic solvents and especially the mineral oils employed as vehicle in conventional polishing compositions.

The finishing composition of this invention is a blend of three resinous components: (a) Urea-formaldehyde resin soluble in alcohols, (b) glycerol-polycarboxylic acid resin containing combined vegetable oils preferably between about 27% and 58% (based on combined fatty acid), and (3) a glycerol ester of the reaction product of rosin and a dicarboxylic acid of the type of maleic acid. The tight bond between the wood surface and the heat-hardenable coatings is obtained by the use of a "wash" coat, or thin dispersion, of a resinous composition containing a urea-formaldehyde resin, which coat is applied to the wood surface before the filler and it is not separately baked or otherwise deliberately heat-hardened.

The urea-formaldehyde resin may be made in any of the usual ways which yield alcohol soluble resins. Preferably, the resin should also be hydrocarbon soluble to facilitate the use of the cheaper, more common solvents in wood finishing, and the preferred resins are those which have been rendered hydrocarbon soluble by reaction with aliphatic alcohols having from 4 to 8 carbon atoms. Although not absolutely essential, it is highly desirable to incorporate an accelerator in the resin in order to obtain a composition which will set quickly at relatively low temperatures. Any acid catalyst may be used, and ammonium acid phosphate is preferred. A particularly good urea resin of this type is shown in Example 1.

*Example 1*

The urea resin dispersion was made as follows:

| | Parts by weight |
|---|---|
| Formaldehyde (37% by vol. in water) | 1,520 |
| Urea | 446 |
| Aqueous ammonia | 30 |
| Ammonium acid phosphate | 3.38 |
| Non-aqueous distillate from previous batch | 1,950 |
| Butanol | 1,104 |
| Solvesso #3 | 500 |
| Octyl alcohol | 90 |

The above materials were mixed in a kettle equipped with a distillation system. After heating for 12 hours at about 200° F. under total reflux, the volatile constituents were distilled. Due to the large quantity of water the distillates separated into two layers. The non-aqueous layer was decanted and saved for re-use in the next batch. This non-aqueous layer which is recycled in the process is the ingredient referred to as the "non-aqueous distillate from previous batch," and it contained about 75% butanol. After 1950 parts of this non-aqueous layer were distilled the residue in the kettle was cooled and used directly in preparing the three-component finish. It has an approximate composition of

| | Per cent by weight |
|---|---|
| Solids | 50 |
| Butanol | 20 |
| Octyl alcohol | 5 |
| Solvesso #3 (hydrocarbon solvent) | 25 |

The oil-modified glycerol-polycarboxylic acid resin may be made in conventional manner by reacting the glycerol, polycarboxylic acid and vegetable oils (or their fatty acids) together. In order that the resin may have the necessary flexibility and softness its composition should be within the limits of about 42% to about 73% of contained glycerol-polycarboxylic ester (e. g. glyceryl phthalate). That is, the oil modification should be at least about 27% and preferably not more than about 58% by weight of combined fatty acids. More oil modification gives a product which is too soft and will not set sufficiently hard, and too little oil modification causes the final coating composition to become brittle and incompatible with the urea resins. A typical alkyd resin is given in Example 2.

*Example 2*

The alkyd resin dispersion mas made as follows:

| | Parts by weight |
|---|---|
| Phthalic anhydride | 19.40 |
| Glycerol | 10.57 |
| Linseed oil distilled fatty acids | 15.07 |
| China-wood oil | 6.80 |
| Solvent naphtha | 48.16 |

The phthalic anhydride, glycerol, linseed fatty acids and China wood oil were heated at 525° F. in 1⅓ hours, held at that temperature for an additional half hour and cooled to 475° F. The mixture was maintained at this temperature until the viscosity had risen to where the material could be drawn into a string about a half inch long. At this point the resin had an acid number between 15 and 20. Then the batch was cooled to 410° F. and the solvent naphtha slowly added over a period of about a half hour. The total reaction time was about 4 hours.

If it is desired to omit the China-wood oil, the resin may be made entirely with linseed fatty acids and diluted or extended with dehydrated castor oil to give a product having essentially similar properties as the resin shown in Example 2. Other modifications of the resin to produce a substance having the properties of the resin shown in Example 2 are familiar to those skilled in the art, the only limitation being the extent of oil modification, as indicated above. As for the degree of reaction or condensation, it has been found that best results are obtained when the resin is condensed as far as possible while still maintaining solubility in hydrocarbons and compatability with urea resins.

The modified rosin glycerol ester may also be made in conventional manner. The rosin should preferably be reacted with the polycarboxylic unsaturated acid, particularly maleic acid, until the acid-rosin adduct contains at least about 12% by weight of polycarboxylic acid, and generally not more than about 14%. Then the adduct is reacted with glycerol. The most desirable product is made by carrying the glycerol reaction to the point where the acid number is not more than about 35, and is preferably no greater than about 20. A typical maleic-rosin-glycerol complex is shown in Example 3.

*Example 3*

| | Parts by weight |
|---|---|
| Rosin | 71.3 |
| Maleic anhydride | 11.6 |
| Glycerol | 17.1 |
| Triphenyl phosphite | 0.3 |

The rosin was heated to 500° F. in a closed vessel equipped with reflex, cooled to 440° and the triphenyl phosphite catalyst added. After cooling to 400° F. the maleic anhydride was added over about one hour and the mixture heated to 450° F. After a half hour at this temperature the glycerol was added over a period of about two hours. When the pressure reached about 3 or 4 pounds gauge the exhaust valve was opened sufficiently to prevent a further increase in pressure and the mixture was kept refluxing at 450° F. until it was clear. Then the reflux was stopped and the material heated to 480° F. and held at that temperature until it had a melting point of about 130° C. The total reaction time was about 14 hours for a batch amounting to about 3000 pounds.

In preparing the final coating composition the urea-formaldehyde and glycerol polycarboxylic acid resins may be used in any proportions between the limits of about 1:3 and 3:1, as an excessive amount of the urea resin produces a brittle film and not enough makes it too soft. The rosin ester complex should preferably be present in the final composition to the extent of at least about 3% by weight, and it should not exceed about 20% by weight. Less rosin ester complex than about 3% does not impart the highly characteristic polishing properties to an appreciable extent, and more than about 20% tends to make the film brittle and reduces its ability to withstand extreme changes in temperature (as may be encountered in homes in winter) without checking. Also, it is desirable to add an accelerator and oil driers to permit setting or hardening at reduced temperatures, or fast hardening at high temperatures. The preferred composition is given in Example 4.

*Example 4*

| | Per cent by weight |
|---|---|
| Maleic-rosin ester of Example 3 | 10 |
| Urea resin of Example 1 | 36 |
| Glycerol-phthalate resin of Example 2 | 36 |
| Alkyl ester of phosphoric acid | 1 |
| Cobalt naphthenate drier (3.2% Co) | 1 |
| Hydrocarbon solvent | 16 |
| | 100 |

This coating composition may be sprayed on the wood (or otherwise applied), preferably over a filler, until a uniform film is deposited. After a preliminary air drying period to remove most of the volatile solvent the film is baked, preferably at a temperature not exceeding about 150° F. unless provision is made to maintain a relatively high humidity in the atmosphere surrounding the finish, as otherwise the finish may be blistered. The process of baking these finishes at temperatures from 150° F. to 250° F. under conditions of high humidity is described and claimed in our copending application Serial No. 393,556, filed May 15, 1941, now Patent No. 2,381,944, issued August 14, 1945.

The above described coating composition may be applied to the wood surface in any of the conventional ways. However, difficulty is sometimes encountered in securing a tight bond between the wood and the coating composition, and where the tightest possible bond must be obtained it is necessary to give the wood surface a preliminary treatment which may be in the nature of a wash coat prior to the filling operation. After the wood has been smoothed and stained, it is customary to apply a stiffening solution or wash coat for the purpose of raising the uncut fibers left from the smoothing operation and stiffening them sufficiently so that they may be removed by a subsequent sanding operation. Ordinarily the wash coat consists of a very thin dispersion of shellac, and more recently thin dispersions of some of the cellulose esters have been used. However, the heat-hardenable resin compositions do not adhere well to the wood if there is any appreciable amount of shellac present. This may be due to the fact that at the baking temperatures employed the shellac tends to melt and loosen the top coat. Also, top coats containing urea-formaldehyde resins do not adhere well over films of the cellulose esters unless the film is applied so thinly that the pores of the wood are not blocked and the urea resin top coat can fill the pores sufficiently to obtain a mechanical bond. However, the use of a filler tends to offset the advantages of the very thin cellulose ester film.

The heat-hardenable finishes or top coats may be made to adhere strongly to wood surfaces with or without the presence of fillers if a wash coat is employed which contains substantial quantities of urea-formaldehyde resins. For this purpose the urea resin described in Example 1 may be used, and it is preferably mixed with the glycerol-polycarboxylic acid resin described in Example 2, in about equal proportions. A mixture of these two resins is dispersed in suitable volatile solvents to produce a dispersion having about the same consistency or fluidity as the conventional wash coat, and the smooth, stained wood is given a light coating therewith. It is unnecessary to bake the wash coat or otherwise employ special means for hardening the resin inasmuch as the resins set up sufficiently by air-drying to raise and stiffen the wood fibers so that they may be removed directly by sanding. In fact, the tightest bond between the finish or top coat and the wood is obtained when the wash coat is not deliberately heat-set at all. After application of the wash coat and subsequent sanding of the wood surface, an oil modified alkyd filler is normally rubbed into the pores of the wood. This filler may be any of those disclosed in the art, such as, for example, the materials described in the Dietz and Oeffinger Patent No. 2,225,262, issued December 17, 1940. After heat setting of the filler, the top coat may be applied as described above.

We claim:

1. Process of obtaining a resistant finish on wood surfaces which comprises applying to the wood surface a thin dispersion of a mixture of an alcohol-soluble urea-formaldehyde resin and an oil modified glycerol-polycarboxylic acid resin in a volatile solvent, evaporating the solvent and applying a continuous coating comprising essentially three resinous components dispersed in a solvent; said components being (a) an alcohol-soluble urea-formaldehyde resin, (b) a fatty acid modified glycerol-polycarboxylic acid condensation product containing between about 27% and about 58% by weight of combined fatty acids, and (c) a glycerol ester of the reaction product of rosin and an unsaturated polycarboxylic acid; evaporating the solvent and subjecting said coating to an elevated temperature for a sufficient period of time to harden the same.

2. Process of obtaining a resistant finish on wood surfaces which comprises applying to the wood surface a thin dispersion of a mixture of an alcohol-soluble urea-formaldehyde resin and an oil modified glycerol-polycarboxylic acid resin in a volatile solvent, evaporating the solvent and applying a continuous coating comprising essentially three resinous components dispersed in a solvent; said components being (a) an alcohol-soluble urea-formaldehyde resin, (b) a fatty acid modified glycerol-polycarboxylic acid condensation product containing between about 27% and about 58% by weight of combined fatty acids, and (c) a glycerol ester of the reaction product of rosin and maleic acid; evaporating the solvent and subjecting said coating to an elevated temperature for a sufficient period of time to harden the same.

3. Process of obtaining a resistant finish on wood surfaces which comprises applying to the wood surface a thin dispersion of a mixture of an alcohol-soluble urea-formaldehyde resin and an oil modified glycerol-polycarboxylic acid resin in a volatile solvent, evaporating the solvent and applying a continuous coating comprising essentially three resinous components dispersed in a solvent; said components being (a) an alcohol-soluble urea-formaldehyde resin, (b) a fatty acid modified glycerol-phthalic acid condensation product containing between about 27% and about 58% by weight of combined fatty acids, and (c) a glycerol ester of the reaction product of rosin and maleic acid said reaction product containing between about 12% and about 14% maleic acid; evaporating the solvent and subjecting said coating to an elevated temperature for a sufficient period of time to harden the same.

4. Process of obtaining a resistant finish on wood surfaces which comprises applying to the wood surface a thin dispersion of a mixture of an alcohol-soluble urea-formaldehyde resin and an oil modified glycerol-polycarboxylic acid resin in a volatile solvent, evaporating the solvent and applying a continuous coating comprising essentially three resinous components dispersed in a solvent; said components being (a) an alcohol-soluble urea-formaldehyde resin, (b) a fatty acid modified glycerol-phthalic acid condensation product containing between about 27% and about 58% by weight of combined fatty acids, and (c) a glycerol ester of the reaction product of rosin and maleic acid said reaction product containing between about 12% and about 14% maleic acid; the ratio of said component a to said component b being within the range of about 1:3 and 3:1 by weight, and said component c being present in an amount of between about 3% and about 20% by weight in the final product; evaporating the solvent and subjecting said coating to an elevated temperature for a sufficient period of time to harden the same.

WILLIAM E. BERRY.
MELVILLE M. WILSON.

REFERENCES CITED

The following references are of record in the file of this patent:

UNITED STATES PATENTS

| Number | Name | Date |
| --- | --- | --- |
| 1,197,601 | Buffum | Sept. 12, 1916 |
| 1,860,098 | Jaeger | May 24, 1932 |
| 1,927,086 | Ellis | Sept. 19, 1933 |
| 2,063,239 | Gabriel | Dec. 8, 1936 |
| 2,143,618 | Booty | Jan. 10, 1939 |
| 2,174,132 | Maisch | Sept. 26, 1939 |
| 2,227,843 | Quenelle | Jan. 7, 1941 |
| 2,292,468 | Oeffinger | Aug. 11, 1942 |

FOREIGN PATENTS

| Number | Country | Date |
| --- | --- | --- |
| 538,342 | Great Britain | July 30, 1941 |